United States Patent [19]

Koerner et al.

[11] Patent Number: 4,476,282

[45] Date of Patent: Oct. 9, 1984

[54] METHOD OF PRODUCING FINELY DIVIDED, STABLE OIL-IN-WATER EMULSIONS OF ORGANOPOLYSILOXANES

[75] Inventors: Götz Koerner; Friedhelm Nickel; Hans Rott; Günter Schmidt, all of Essen, Fed. Rep. of Germany

[73] Assignee: Th. Goldschmidt AG, Essen, Fed. Rep. of Germany

[21] Appl. No.: 489,853

[22] Filed: Apr. 29, 1983

[30] Foreign Application Priority Data

May 4, 1982 [DE] Fed. Rep. of Germany ....... 3216585

[51] Int. Cl.$^3$ ............................................. C08L 83/06
[52] U.S. Cl. .................................... 524/837; 524/588; 528/21; 528/23
[58] Field of Search ................. 524/837, 588; 528/21, 528/23; 252/351

[56] References Cited

U.S. PATENT DOCUMENTS 3,706,695 12/1972 Huebner et al. .................... 524/588

FOREIGN PATENT DOCUMENTS 1191289 5/1970 United Kingdom ................ 524/837

Primary Examiner—Theodore E. Pertilla
Attorney, Agent, or Firm—Toren, McGeady and Stanger

[57] ABSTRACT

A method of producing finely divided, stable oil-in-water emulsions of organopolysiloxanes is disclosed. The condensation and/or polymerization of lower molecular organosilicon compounds is carried out in a paste which consists of the organosilicon compounds, the amount of emulsifier required for preparing the emulsion and an amount of water equal to 0.5 to 3 times the weight of the emulsifier. This transparent to weakly opaque paste is then stirred in water in order to form an emulsion.

10 Claims, No Drawings

METHOD OF PRODUCING FINELY DIVIDED, STABLE OIL-IN-WATER EMULSIONS OF ORGANOPOLYSILOXANES

BACKGROUND OF THE INVENTION

1. Field of the Invention

The invention relates to a method of producing finely divided, stable oil-in-water emulsions of organopolysiloxanes by condensation and/or polymerization of lower molecular organosilicon compounds in finely divided form in the presence of emulsifiers and condensation and polymerization catalysts.

2. Field of the Invention

Emulsions of organopolysiloxanes in water can be produced by emulsifying organopolysiloxanes of the desired chemical structure and the required viscosity with the help of emulsifiers in water. This method can be used especially for organopolysiloxanes of low viscosity. There are, however, considerable difficulties with respect to transforming silicones of higher molecular weight, and therefore of higher viscosity, into an emulsion.

The preferred method of the state of the art for producing finely divided, stable oil-in-water emulsions of organopolysiloxanes consists therefore of transforming lower molecular organosilicon compounds into an emulsion and condensing and/or polymerizing the organosilicon compounds in the disperse phase of the emulsion.

For example, a method is described in German Auslegeschrift 14 95 512 for producing stable organopolysiloxane emulsions by polymerizing and/or copolymerizing organopolysiloxanes, which optionally are produced in situ and which are built up essentially of units of the general formula

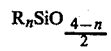 (I)

(R being hydrogen or a monofunctional, optionally halogenated hydrocarbon radical, n has an average value of 1 to less than 3),
and/or silcarbanes of the general formula $$HO(R)_2SiQSi(R)_2OH \quad (II)$$

(Q being a bifunctional hydrocarbon radical with fewer than 15 carbon atoms, which is possibly interspersed with ether oxygen atoms and is linked to the silicon atoms by Si-C bonds),
or dihydroxydiphenylsilanes in an aqueous medium in finely divided form and in the presence of catalysts. This method is characterized by the fact that sulfonic acids having the formula

 (III)

(R' being a monofunctional hydrocarbon radical with at least 6 carbon atoms)
is used as the catalyst.

German Auslegeschrift 15 70 451 discloses a method for producing stable organopolysiloxane emulsions by polymerizing and/or copolymerizing organopolysiloxanes having units of the general formula

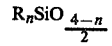 (I)

and/or silcarbanes of the general formula $$HO(R_2)SiQSi(R)_2OH \quad (II)$$

(R being hydrogen atoms or monofunctional, optionally halogenated hydrocarbon radicals, Q being bifunctional hydrocarbon radicals with fewer than 15 carbon atoms, optionally interspersed with ether oxygen atoms, the hydrocarbon radicals being linked to silicon atoms by carbon atoms; n=1, 2 or 3 or has an average value between 1 and 3),
in an aqueous medium in finely divided form and in the presence of catalysts. The catalysts used in this method are alkyl hydrogen sulfates of the general formula

 (III)

(R' is a monofunctional, aliphatic, hydrocarbon radical with at least 6 carbon atoms).

It is pointed out in this Auslegeschrift that the prior emulsification of the organosilicon compounds is not essential for the method claimed there since emulsification and polymerization would take place practically simultaneously.

In practice, the condensation and/or polymerization of lower molecular organosilicon starting compounds in emulsion form has become the generally accepted method for producing finely divided oil-in-water emulsions of organopolysiloxanes. It is, however, a serious disadvantage of this method that the condensation and/or polymerization must be carried out in the presence of large amounts of water and that therefore the use of correspondingly large stirrer equipped vessels is required. In addition, a relatively long time is required, especially in the case of condensation reactions, in order to reach the desired molecular weight, so that the space/time yield of such methods is unsatisfactory.

SUMMARY OF THE INVENTION

We have discovered a method which will enable such a condensation and/or polymerization to be carried out before the emulsion is formed and, in addition, reduce the time required to reach the desired molecular weight.

More particularly, this is accomplished by
(a) first dispersing the amount of emulsifier required for obtaining a stable emulsion in an amount of water equal to 0.5 to 3 times the weight of the emulsifier;
(b) adding the amount of organosilicon compound which is to be emulsified to this dispersion and homogenizing the mixture by the action of high shear forces until a uniform, transparent to slightly opaque paste is formed, and
(c) when the desired molecular weight is reached, stirring the paste with the remaining water, with little shear in a known manner into an emulsion;
and adding a conventional catalyst to steps (a) or (b) in amounts of 0.5 to 5 weight percent relative to the organosilicon compound and deactivating the catalyst by neutralization when the desired molecular weight is reached.

The essence of the invention therefore comprises the steps of producing a uniform, transparent to slightly opaque paste from the required amount of emulsifier, relatively small amounts of water and the total amount of organosilicon starting compounds, and of condensing and/or polymerizing the organosilicon compounds in this gelatinous paste in the presence of catalysts. Only after the desired molecular weight is attained, that is, at the end of the condensation and/or polymerization reaction, is the catalyst deactivated by neutralization and the desired dilute emulsion prepared by diluting the paste with little shear.

DESCRIPTION OF THE PREFERRED EMBODIMENT

In step (a) of the method, the total amount of emulsifier, which will finally be required to form the stable oil-in-water emulsion is dispersed in the 0.5 to 3-fold weight of water. The emulsifiers used are the nonionic, anionic, cationic or ampholytic emulsifiers known from the state of the art.

Examples of such nonionic emulsifiers are the addition products of ethylene oxide on compounds with acidic hydrogen, such as, fatty alcohols, alkyl phenols or alcohols synthesized by the oxo-process. The HLB value of the emulsifiers should be selected so that it falls within the range which favors the formation of oil-in-water emulsions. In general, emulsifiers are used having an HLB value of at least 10. Suitable nonionic emulsifiers are, for example, the addition products of ethylene oxide on nonylphenol or i-tridecyl alcohol, 10 to 15 moles of ethylene oxide preferably being added.

Suitable for use as anionic emulsifiers are the alkali salts of fatty acids or the alkali, alkaline earth or amine salts of organic sulfonic acids, and especially the alkylarylsulfonic acids. Examples of such emulsifiers are the sodium salt of dodecyl benzene sulfonic acid or of lauryl sulfuric acid.

As cationic emulsifiers, quaternary ammonium compounds, such as, for example, didecyldimethylammonium chloride or stearyldimethylbenzylammonium chloride can be used.

As ampholytic emulsifiers, betaines may be used having the formula

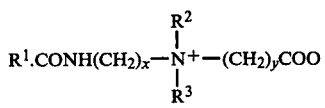

which
R$^1$ is the alkyl radical of a fatty acid with 10 to 18 carbon atoms,
R$^2$ and R$^3$ are the same or different and represent an alkyl or a hydroxyalkyl radical with 1 to 4 carbon atoms,
x=2 or 3 and
y=1, 2, 3 or 4.

Examples of such betaines are lauroylamidopropyl-N-dimethylaminoacetic acid and stearoylamidopropyl-N-dimethylaminoacetic acid.

It is possible, of course, to also use mixtures of nonionic emulsifiers with anionic, cationic or ampholytic emulsifiers.

In conformity with the state of the art, acids or bases are used as catalysts. Those acids, which are surface active are particularly suitable as acids. Examples of such catalysts are sulfonic acids, such as, alkylsulfonic acids or alkylarylsulfonic acids, for example, dodecylbenzenesulfonic acid. Furthermore, half esters of sulfuric acid, for example, dodecylsulfuric acid esters or partial esters of phosphoric acid, for example, mixtures of octyl and dioctyl phosphates can be used. As bases, the surface active organic ammonium compounds, such as, for example, didecyldimethylammonium chloride tetrabutylammonium chloride or benzyltrimethylammonium chloride, are preferably used.

Even though catalysts known from the state of the art may be used, surface active catalysts are preferred, as they can simultaneously act, at least partially, as an emulsifier.

In general, 0.5 to 5 weight percent of catalyst, relative to the weight of the organosilicon starting compounds, are used. In the inventive method, the catalysts are added either to the water in step (a) or to the paste when carrying out step (b).

The catalyst is deactivated when the desired molecular weight is reached. This can be done simply by neutralizing the mixture.

The paste is formed from its constituents by the action of high shear forces. Equipment with which high shear forces can be generated is known to those skilled in the art. Such equipment generally consists of high-speed stirrers, in which the stirring part is constructed, for example, in the form of a dissolvator disk. Homogenizing equipment, which works on the rotor-stator principle, is also suitable.

The pastes obtained after completing step (b) of the method, are transparent or slightly opaque. They have a gelatinous consistency. Also, single droplets containing the organosilicon starting compounds, which are characteristic of oil-in-water emulsions, cannot be identified under the microscope.

The condensation and/or polymerization of the lower molecular organosilicon compounds to the desired organopolysiloxanes of higher molecular weight takes place in this paste. In order to increase the reaction rate, the paste may be heated to about 20° to 80° C. The condensation and/or polymerization reaction is essentially completed within a period of 30 minutes to 24 hours. During this time, the paste may be stirred, especially if higher temperatures are used.

If lower molecular organosilicon compounds containing alkoxy groups linked to silicon are used, it is advisable to remove the alcohols, released by the reaction, from the paste in order to complete the reaction and to increase the stability of the emulsions which are formed later. This is accomplished either by increasing the temperature, by reducing the pressure, or by a combination of both.

When the desired molecular weight is reached, the catalyst is deactivated by known procedures. The paste is now stirred with the remaining water, high shear forces being avoided and a finely divided, as well as stable, oil-in-water emulsion being obtained.

In order to obtain 100 parts by weight of emulsion from a typical procedure in accordance with the present invention, about 1 to 5 parts by weight of emulsifier are dispersed in 0.5 to 15 parts by weight of water and 20 to 60 parts by weight of organosilicon compound are added to this dispersion and homogenized until a transparent paste is formed. The 1 to 5 parts by weight of emulsifier contain 0.1 to 3 parts by weight of surface active catalyst. When the desired molecular weight of the organopolysiloxane is reached and the catalyst has been neutralized, the transparent paste is diluted with water to 100 parts by weight.

Compounds known from the state of the art can be used as the organosilicon starting compounds. These include primarily polysiloxanols, especially α,ω-dihydroxysiloxanes having a molecular weight of about 2,000 to 5,000 and a viscosity of 50 to 150 cSt at 25° C. Especially preferred are the α,ω-dihydroxypolydimethylsiloxanes. Moreover, alkoxysilanes or alkoxysiloxanes, in which the alkoxy group contains 1 to 4 carbon atoms, are useful as starting compounds. Examples of suitable alkoxysilanes are methyltriethoxysilane, 3-aminopropyltriethoxysilane, 3-mercaptopropyltrimethoxysilane or octyltriethoxysilane.

Cyclic organopolysiloxanes, such as, for example, octamethylcyclotetrasiloxane or decamethylcyclopentasiloxane are also suitable for the inventive method.

It was surprising that the condensation and/or polymerization of the organosilicon starting compounds proceeds at an increased rate in the inventive process and that the paste, containing the condensed and/or polymerized organopolysiloxanes, can be transformed into a stable, very finely divided oil-in-water emulsion by moderate stirring. It was furthermore surprising that there is no change in the colloidal structure of the transparent paste, although there is a major change in molecular weight and therefore a drastic decrease in the number of molecules in the organosilicon.

The following examples illustrate the present invention and provide comparisons with some methods of the state of the art in which the condensation and/or polymerization takes place in an emulsion.

EXAMPLE 1

To a mixture of emulsifiers, consisting of 1 part by weight of the sodium salt of alkylphenol polyethyleneoxide sulfate, 0.25 parts by weight of ethoxylated castor oil, 0.5 parts by weight dodecylbenzenesulfonic acid and 2 parts by weight of water, 35 parts by weight of an α,ω-dihydroxypolydimethylsiloxane with a viscosity of 120 mm$^2$/sec/25° C. were added and homogenized with a dissolvator disk until a transparent paste was formed.

Subsequently, the paste was allowed to stand for 18 hours at room temperature and then diluted with 61.25 parts by weight of water.

After neutralization with triethanolamine, the polysiloxane was isolated from the finely divided, stable, oil-in-water emulsion and its viscosity was measured. The viscosity was found to be 560.000 mm$^2$/sec/25° C.

Comparison Example (a) (German Auslegeschrift 14 95 512, Example 12)

A mixture of 30% of a polydimethylsiloxane having terminal hydroxyl groups and a viscosity of 70 mm$^2$/sec/25° C., 2% of a nonionic emulsifier (synthesized from 1 mole of tridecanol and about 10 moles of ethylene oxide) and 68% water was emulsified at a pressure of 281 kg/cm$^2$.

This emulsion was mixed with 0.5% dodecylbenzenesulfonic acid and then allowed to stand at room temperature (approximately 25° C.). Samples were taken from the emulsion at the times given in the table.

After neutralization with sodium carbonate, the polysiloxanes were isolated and the viscosity was measured.

| Time | Viscosity in mm$^2$/sec/25° C. |
| --- | --- |
| 2 days | 90,319 |
| 5 days | 123,300 |

-continued

| Time | Viscosity in mm$^2$/sec/25° C. |
| --- | --- |
| 8 days | 304,000 |

EXAMPLE 2

The paste, formed as in Example 1, was homogenized and heated with stirring to 60° C.

After a period of two hours, the paste was diluted with water to a finely divided, stable oil/water emulsion, a low shear being employed for this purpose.

The acid catalyst contained in the emulsion, was neutralized by the addition of triethanolamine.

The emulsion was broken by the addition of ethanol.

The polysiloxane so isolated had a viscosity of 115,000 mm$^2$/sec/25° C. The cyclic siloxane content was less than 0.1%.

Comparison Example (b) (German Auslegeschrift 14 95 512, Example 6)

A mixture of 560 g of cyclic dimethylsiloxane, 8 g of dodecylbenzenesulfonic acid and 1032 g of water was homogenized at a pressure of 281 kg/cm$^2$.

Portions of the emulsion were heated at different temperatures for 24 hours and subsequently neutralized with sodium carbonate until a pH of about 7 was reached.

The viscosities of the individual polysiloxanes and the percentage of cyclic components in the polysiloxanes were determined.

| Temperature °C. | Viscosity mm$^2$/sec/25° C. | Cyclic Product % |
| --- | --- | --- |
| 50 | 120,000 | 10.1 |
| 70 | 23,000 | 10.1 |

It can be seen from Examples 1 and 2, as well as from this comparison example, that the inventive method proceeds significantly more rapidly and does not lead to the formation of significant amounts of cyclic products which are of no practical value.

EXAMPLE 3

To an emulsifier mixture, consisting of 0.36 parts by weight of didecyldimethylammonium chloride, 0.24 parts by weight of dialkyldimethylammonium chloride (alkyl radical derived from hydrogenated tallow), 0.9 parts by weight of ethoxylated i-tridecyl alcohol and 3.0 parts by weight of water, 45 parts by weight of an α,ω-dihydroxypolydimethylsiloxane having a viscosity of 120 mm$^2$/sec/25° C. were added first and then 2 parts by weight of a 1N potassium hydroxide solution. The mixture was homogenized with the high shear forces of the dissolvator disk, until a gelatinous, transparent paste was formed.

The paste was subsequently heated with further stirring to 60° C. and, after a condensation period of 3 hours, diluted with 50.5 parts by weight of water to a stable emulsion.

After neutralization with acetic acid, the emulsion was broken by the addition of ethanol.

The isolated polysiloxane had a viscosity of 84,000 mm$^2$/sec/25° C.

EXAMPLE 4

To an emulsifier mixture, consisting of 0.5 parts by weight of didecyldimethylammonium chloride, 1 part by weight of lauroylamidopropyl-N-dimethylaminoacetic acid, 2 parts by weight of ethoxylated i-tridecyl alcohol and 4.5 parts by weight of water, 45 parts by weight of an α,ω-dihydroxypolydimethylsiloxane, having a viscosity of 120 mm²/sec/25° C. and 3.1 parts by weight of 3-aminopropyltriethoxysilane were added first, followed by 2 parts by weight of 1N potassium hydroxide solution. The mixture was homogenized with a dissolvator disk until a transparent paste was formed.

The paste was then heated under vacuum and with stirring for 30 minutes at 35° C. and subsequently diluted with 47 parts by weight of water to a finely divided emulsion.

After the emulsion was neutralized with acetic acid, the polysiloxane was isolated by breaking the emulsion.

There was a gelatinous residue which, on standing, condensed further to a rubbery product.

EXAMPLE 5

To an emulsifier mixture, consisting of 2.5 parts by weight of ethoxylated nonylphenol, 0.3 parts by weight of tetrabutylammonium hydrogen sulfate and 3.5 parts by weight of 2 molar sodium hydroxide solution, 40 parts by weight of a branched methylpolysiloxane with an ethoxy group content of 20%, which can be synthesized by known procedures by hydrolyzing methyltrichlorosilane in a water/ethanol mixture, were added and the mixture was homogenized by means of a dissolvator disk until a transparent paste was formed.

The paste was then heated with stirring for 30 minutes at 25° C. and subsequently diluted with 53.7 parts by weight of water to a finely divided, stable emulsion.

After neutralization with acetic acid, the polysiloxane was isolated by breaking the emulsion.

The polysiloxane released had a gelatinous consistency and, on standing in air, condensed further to a resinous product.

EXAMPLE 6

To an emulsifier mixture, consisting of 1 part by weight of ethoxylated nonylphenol, 1 part by weight of an ethoxylated triglyceride, 0.3 parts by weight of tetrabutylammonium hydrogen sulfate and 3 parts by weight of a 2 molar sodium hydroxide solution, a mixture of 20 parts by weight of the branched methylpolysiloxane of Example 5, and 20 parts by weight of a branched phenylmethylpolysiloxane with an ethoxy content of 13%, which was synthesized by a known procedure from 7 parts by weight of phenyltrichlorosilane, 0.5 parts by weight of dimethyldichlorosilane and 7 parts by weight of methyltrichlorosilane by hydrolysis in an ethanol/water mixture, was added by means of dissolvator disk and homogenized at high shear forces until a gelatinous transparent paste was formed.

The paste was subsequently heated with stirring at 30° C. and, after a condensation period of 2 hours, diluted with 54.7 parts of water to a stable emulsion.

After neutralization with acetic acid, the emulsion was broken by the addition of ethanol.

In contrast to a pure mixture of the two branched ethoxy group-containing polysiloxanes used, the isolated wax-like polysiloxane, which was still soluble in a toluene/acetone mixture, condensed on standing in air within a few hours to a resinous residue.

EXAMPLE 7

To a mixture, consisting of 2.5 parts by weight of ethoxylated nonylphenol, 0.4 parts by weight of tetrabutylammonium hydrogen sulfate and 3.5 parts by weight of a 2 molar sodium hydroxide solution, a mixture of 15 parts by weight of dodecyltriethoxysilane and 25 parts by weight of the branched methylpolysiloxane of Example 5, was added and the mixture obtained was homogenized by means of a dissolvator disk until a gelatinous, transparent paste was formed.

The paste was heated with stirring for 2 hours at 25° C. and then diluted with 53.6 parts by weight of water to a finely divided, stable emulsion.

After being neutralized with acetic acid, the emulsion was broken.

On standing in air, the wax-like polysiloxane condensed further. The fully condensed residue was hard without being brittle, and decidedly hydrophobic.

We claim:

1. A method of producing finely divided, stable, oil-in-water emulsions of organopolysiloxanes by the condensation or polymerization of organosilicon compounds in finely divided form in the presence of emulsifiers and condensation or polymerization catalysts, comprising
   (a) dispersing the amount of emulsifier required for obtaining a stable emulsion in an amount of water equal to 0.5 to 3 times the weight of the emulsifier;
   (b) adding the amount of organosilicon compound which is to be emulsified to this dispersion and subjecting the mixture to high shear forces to homogenize it until a uniform, transparent to slightly opaque paste is formed; and
   (c) when the desired molecular weight is reached, stirring the paste obtained with water with little shear to form an emulsion, wherein the catalyst is added in step (a) or step (b) in amounts of 0.5 to 5 weight percent relative to the organosilicon compound and deactivating the catalyst by neutralization when the desired molecular weight is reached.

2. The method of claim 1 wherein the paste obtained in step (b) is heated from 30 minutes to 24 hours at a temperature of 20° to 80° C.

3. The method of claim 1 or 2 wherein the paste is stirred until the desired molecular weight is reached.

4. The method of claim 1 or 2 wherein organosilicon starting compounds containing alkoxy groups are used and the alcohol formed during the condensation is removed from the paste by increasing the temperature or reducing the pressure.

5. The method of claim 1 or 2 wherein 100 parts by weight of emulsion are prepared by dispersing 1 to 5 parts by weight of emulsifier in 0.5 to 15 parts by weight of water, 20 to 60 parts by weight of organosilicon compound are added to this dispersion and homogenized until a uniform paste is formed and, when the desired molecular weight is reached, the homogenate is diluted with water to 100 parts by weight, and wherein 0.1 to 3 parts by weight of catalyst are dispersed in the water required for producing the paste or in the paste which has been formed, and neutralizing the catalyst when the desired molecular weight is reached.

6. The method of claim 1 or 2 wherein the organosilicon compounds are organopolysiloxanes, organoalkoxysilanes with 1 to 4 carbon atoms in the alkoxy group, siloxanes with 1 to 4 carbon atoms in the alkoxy group, cyclic organopolysiloxanes and mixtures thereof.

7. The method of claim 1 or 2 wherein the catalyst is a strong, surface active, organic acid.

8. The method of claim 7 wherein the catalyst is a sulfonic acid, a semi-ester of sulfuric acid or a partial ester of phosphoric acid.

9. The method of claim 1 or 2 wherein the catalyst is a surface active acid or surface active organic ammonium compound.

10. A finely divided stable oil-in-water emulsion of an organopolysiloxane produced by the method of claim 1 or 2.

* * * * *